(12) United States Patent
Malone, III et al.

(10) Patent No.: US 11,098,746 B2
(45) Date of Patent: Aug. 24, 2021

(54) BUTTERFLY COTTER PIN

(71) Applicant: RB Distribution, Inc., Colmar, PA (US)

(72) Inventors: John Thomas Malone, III, Hillsborough, NJ (US); Thomas Allan Reiff, Lafayette Hill, PA (US); Arthur Krystian Mazur, Philadelphia, PA (US)

(73) Assignee: RB Distribution, Inc., Colmar, PA (US)

( * ) Notice: Subject to any disclaimer, the term of this patent is extended or adjusted under 35 U.S.C. 154(b) by 204 days.

(21) Appl. No.: 16/239,159

(22) Filed: Jan. 3, 2019

(65) Prior Publication Data

US 2020/0217352 A1 Jul. 9, 2020

(51) Int. Cl.
*F16B 39/04* (2006.01)

(52) U.S. Cl.
CPC .................................. *F16B 39/04* (2013.01)

(58) Field of Classification Search
CPC ....... F16B 21/12; F16B 39/04; Y10S 411/945
USPC .......................... 411/320, 315–319, 513–515
See application file for complete search history.

(56) References Cited

U.S. PATENT DOCUMENTS

| | | | | |
|---|---|---|---|---|
| 199,099 A | * | 1/1878 | Pickham | F16B 39/04 411/320 |
| 639,337 A | * | 12/1899 | Anthony | F16J 1/18 403/155 |
| 996,540 A | * | 6/1911 | Thomshaw | F16B 39/04 411/317 |
| 1,156,861 A | * | 10/1915 | Payne | B60R 25/00 411/319 |
| 1,285,657 A | | 11/1918 | Finucan | |
| 1,621,346 A | | 3/1927 | Beatty | |
| 1,764,833 A | | 6/1930 | Forget | |
| 1,799,934 A | * | 4/1931 | Strid | F16B 21/12 411/530 |
| 1,992,093 A | | 2/1935 | Place | |
| 2,098,185 A | * | 11/1937 | Hannaford | F16B 21/12 411/516 |
| 2,169,708 A | | 8/1939 | O'Callaghan | |
| 2,385,565 A | * | 9/1945 | Cox | 24/665 |
| 2,463,079 A | | 3/1949 | Albrecht | |
| 2,593,201 A | | 4/1952 | Saunders | |
| 3,203,301 A | | 8/1965 | Faroni | |
| 3,365,996 A | | 1/1968 | Ostrosky | |
| D258,138 S | | 2/1981 | Wood | |
| 4,344,509 A | * | 8/1982 | Harmer | F16D 66/024 116/208 |
| 4,466,763 A | * | 8/1984 | Fischer | F16B 21/12 114/352 |
| D330,673 S | * | 11/1992 | Yamashita | D8/382 |
| 5,308,207 A | * | 5/1994 | Jaskowiak | F16B 21/12 403/378 |
| 5,857,819 A | * | 1/1999 | Lary | F16B 21/125 24/625 |
| D600,102 S | | 9/2009 | Larkin | |
| D661,978 S | | 6/2012 | Holechek | |

(Continued)

*Primary Examiner* — Roberta S Delisle
(74) *Attorney, Agent, or Firm* — Volpe Koenig

(57) ABSTRACT

A resilient cotter pin that has longitudinal central portions that fit in the through hole of a related part. Shoulders connected to longitudinal portions abut the through hole and support curvilinear arms that terminate in an inwardly directed projections that engage a related castellated nut.

11 Claims, 3 Drawing Sheets

(56) References Cited

U.S. PATENT DOCUMENTS

| | | |
|---|---|---|
| D748,972 S | 2/2016 | Primeau et al. |
| D751,374 S | 3/2016 | Dominguez |
| D796,307 S | 9/2017 | Smith et al. |
| 9,808,051 B1 | 11/2017 | Majercak et al. |
| D806,240 S | 12/2017 | Smith et al. |
| D826,399 S | 8/2018 | Smith et al. |
| 10,100,858 B2 | 10/2018 | Jung-Kubiak et al. |
| D834,933 S | 12/2018 | Pi |
| D867,122 S | 11/2019 | Jimenez |
| 2006/0042055 A1 | 3/2006 | Ho |

* cited by examiner

BUTTERFLY COTTER PIN

FIELD OF INVENTION

The invention relates generally to pins that are used to retain or secure various components, such as a nut on a threaded shaft. More particularly, the invention relates to securing vehicle components, such as suspension parts, in a fixed relationship. Most particularly, to a unitary cotter pin that includes shaped engagement elements.

BACKGROUND

The use of cotter pins is well known in the mechanical arts and cotter pins of various shapes and configurations have been proposed over the years. In the simplest form, a cotter pin has two branches that form a central pin that fits into through hole in one of the matted components. The two branches are connected by a curved or semi-circular base that is enlarged or bulbous. The bulbous base is dimensioned so that it has a larger diameter than the central pin and will abut the through hole. The diameter and length of the cotter pin varies according to the application.

In a number of applications, such as vehicle suspension assemblies, the components are jointed with a castellated or castle nut that has a number of slots which are aligned with the through hole so that the bulbous base of the two braches is between the slots. More recently, there have been attempts to introduce castellated or castle nuts that have an external groove that can receive a portion of a cotter pin that is specifically configured to engage the groove and secure the pin. This form of a cotter pin is illustrated in the prior art FIG. 3. However, this configuration requires the use of a specifically grooved nut. The requirement for a groove not only limits the use of typical nuts, it requires an additional manufacture step that may carry additional costs.

SUMMARY

The solution presented is a cotter pin that has a central portion that is comprised of longitudinal portions fit in the through hole. Shoulders connected to longitudinal portions abut the through hole and support curvilinear arms that resemble a truncated or modified "S" or modified "J" that terminates in an inwardly directed projection.

DETAILED DESCRIPTION OF THE PREFERRED EMBODIMENTS

Figure 1:
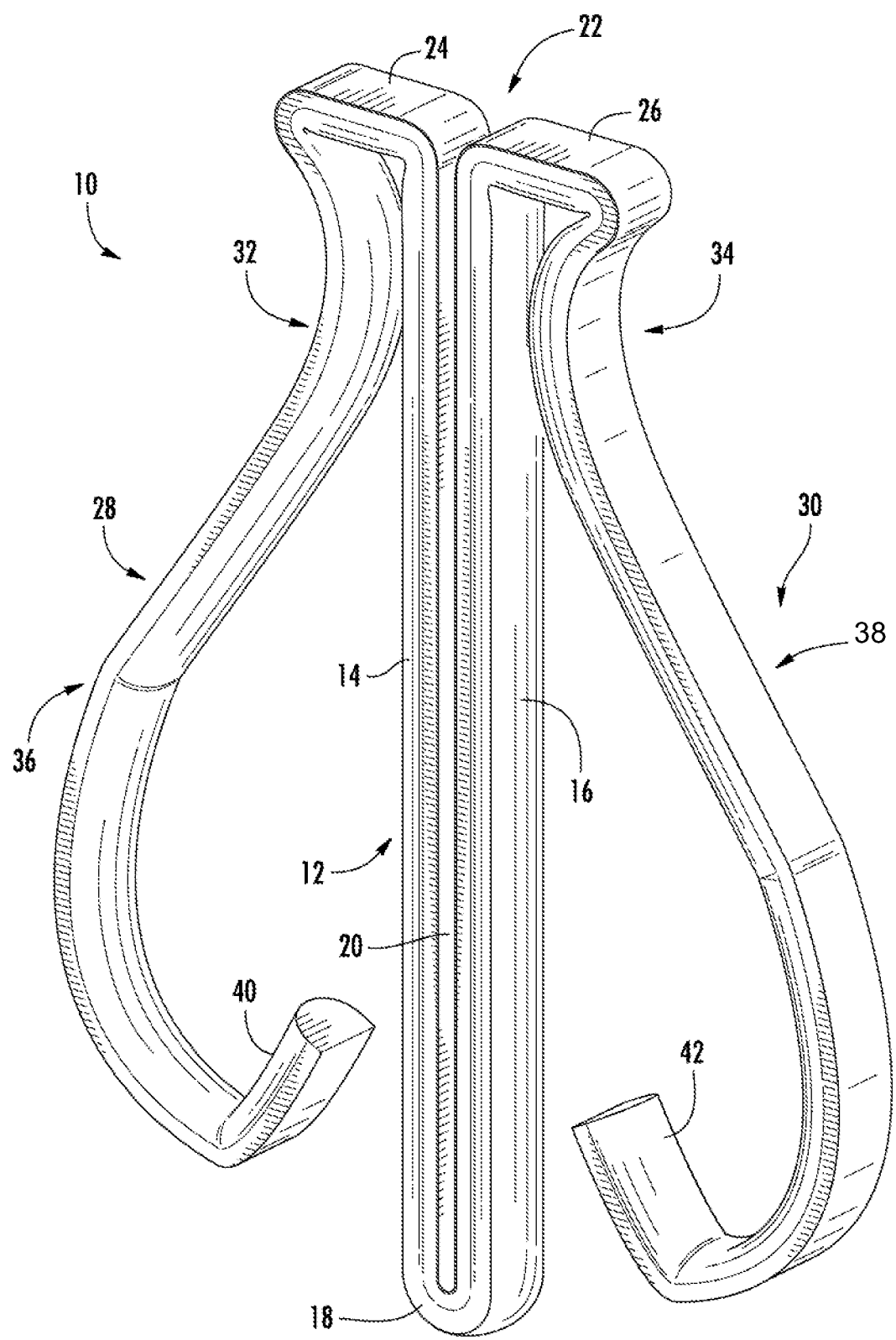
FIG. 1 is a perspective view of a cotter pin according to the invention.

Referring now to FIG. 1, the cotter pin 10 is preferable a unitary construction formed from a single piece of resilient or spring materials that have a strength that is selected according to the application. One presently preferred material is spring steel, which is commonly used in automotive applications. Spring steel is preferred because it is known to be resilient and pliable with a high yield strength, and it can be formed, shaped, and post heat treated.

The central pin 12 is formed by the generally parallel, longitudinal portions or legs 14 and 16 that each form a half of the pin 12 and are joined at respective ends by the closed loop or base 18. The connection of the base loop 18 and the longitudinal halves 14 and 16 defines an interior space 20. The maximum diameter of the central pin 12 is determined by the through hole in the particular application. Accordingly, the base and the longitudinal halves 14 and 16 must conform to the application's maximum diameter.

Figure 2:
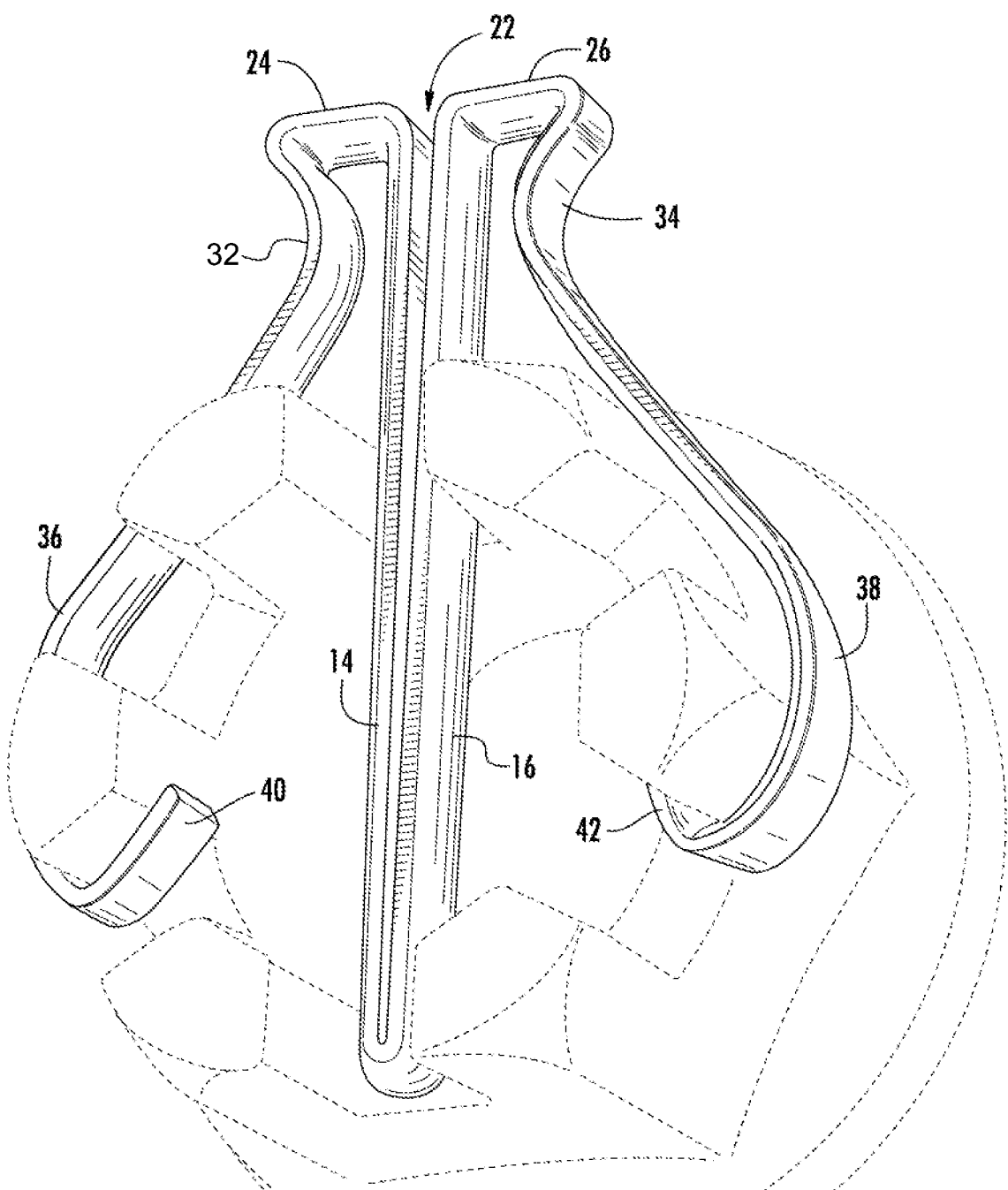
FIG. 2 illustrates the use of the disclosed cotter pin on a castellated nut.
Figure 3:
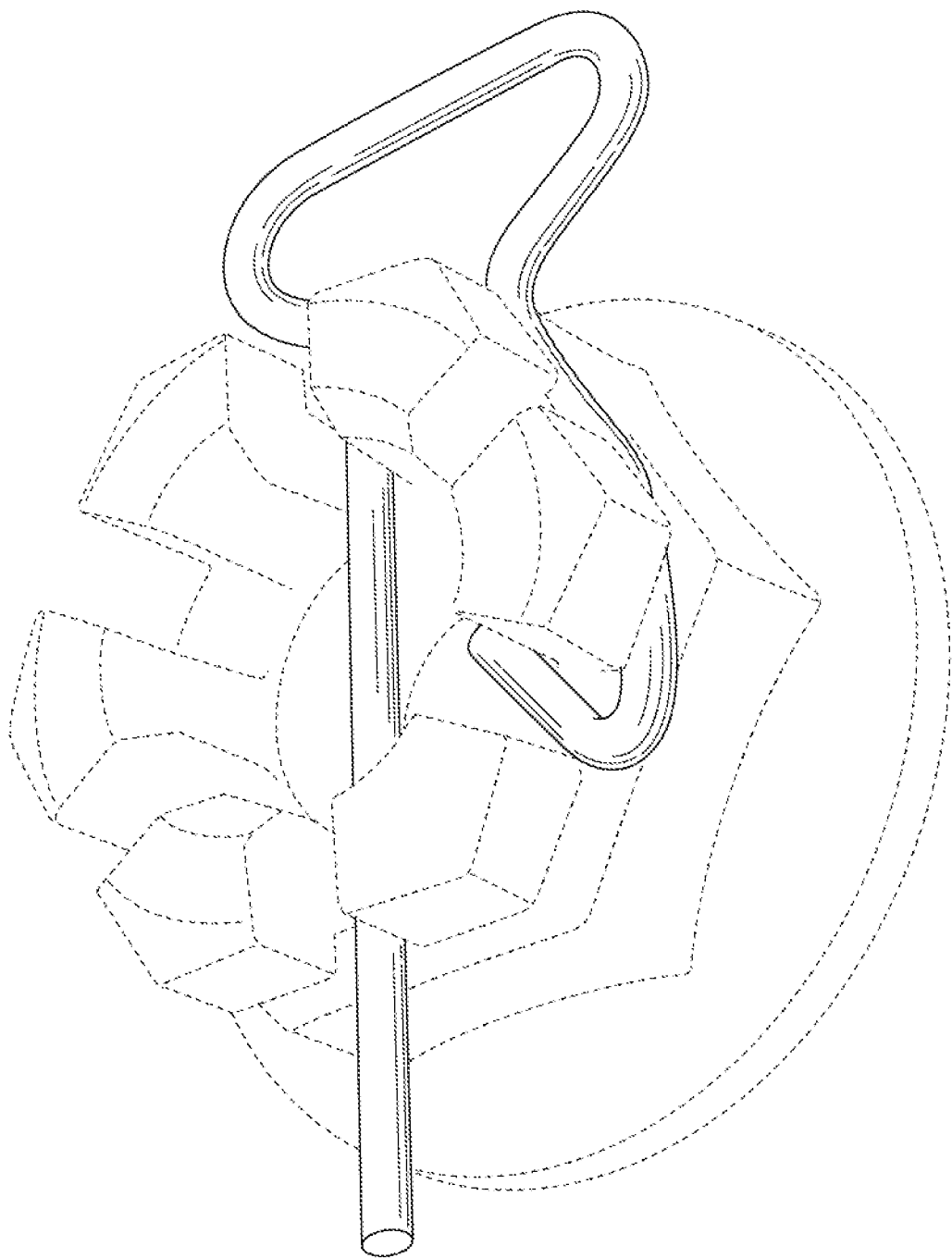
FIG. 3 illustrates a prior art cotter pin that requires a specially grooved castellated nut.

At the opened end 22 opposite the base 18, the respective ends of the longitudinal halves 14 and 16 have outwardly disposed shoulder 24 and 26 that are generally horizontal to the pin 12 and extend in opposite directions. Each shoulder has a dependent arm or wing 28 and 30. The arms or wings 28 and 30 each have a concave portion 32 or 34 that extends inwardly toward the respective longitudinal half 14 or 16. The concave portions 32 and 34 flow into larger convex portions 36 and 38 that extend away from the respective longitudinal half 14 or 16. At the free ends of the arms 30 and 32 there are inwardly directed portions or fingers 40 and 42 that are spaced from the central pin and bent or curved upwardly. The arms 28 and 30 are generally curvilinear and can be seen as modified "S" or "J" shapes. What is desired from these shapes is to establish the arc of the fingers 40 and 42 so that they initially spread arms 28 and 30 as they pass over facets in the wide part of the nut. When the convex portions of the arms 28 and 30 pass around the nut, the fingers 40 and 42 will spring inwardly to come to rest in the slotted portion of the castle nut. The spreading and movement of the longitudinal halves 14 and 16 is assisted by the opened end 22. FIG. 2 illustrates the at rest position with the fingers 40 and 42 gripping of the facets of the a nut.

It will be appreciated that the specific dimensions of the cotter pin 10 will be determined according to the application and scaling will depend on the nut in the application.

What is claimed is:

1. A cotter pin comprising:
    a central pin that is defined by longitudinal portions;
    each longitudinal portion is connected to a base at a first end and to a shoulder at a second end;
    each shoulder is perpendicular to the respective longitudinal portion and supports a curvilinear arm; and
    each curvilinear arm extends toward the base and terminates in a free end that has an inwardly directed portion that bends toward a respective shoulder.

2. The cotter pin of claim 1, wherein each curvilinear arm has a concave portion and a convex portion.

3. The cotter pin of claim 2, wherein the inwardly directed portion of each curvilinear arm extends from the convex portion.

4. The cotter pin of claim 1, wherein each of the curvilinear arms has a modified "S" shape.

5. The cotter pin of claim 1, wherein each of the curvilinear arms has a modified "J" shape.

6. The cotter pin of claim 1, wherein the cotter pin is a single unitary construction of spring steel.

7. The cotter pin of claim 1, wherein the cotter pin is a unitary piece having a resilient construction.

8. A cotter pin comprising:
    a central member that is defined by longitudinal portions;
    each longitudinal portion is connected to a base at a first end and open at a second end that has a horizontal shoulder; and,
    two curvilinear arms;
    wherein each curvilinear arm depends from a respective horizontal shoulder, extends towards the base, and terminates in an inwardly directed projection that extends toward a respective second end of a longitudinal portion.

9. A cotter pin comprising:
a unitary resilient structure having,
 a central pin with longitudinal portions that are joined by a base at one end and separated at a second end that is joined to a horizontal portion; and,
 two curvilinear arms that each depend from a respective horizontal portion joined to a respective second end of a longitudinal portion and each curvilinear arm terminates in a free end that is directed inwardly toward a respective longitudinal portion and extends toward a respective second end of a longitudinal portion.

10. The cotter pin of claim 9, wherein each curvilinear arm has a concave portion and a convex portion.

11. The cotter pin of claim 10, wherein the free end of each curvilinear arm extends from the convex portion.

* * * * *